(12) United States Patent
Grumberg et al.

(10) Patent No.: US 9,243,742 B2
(45) Date of Patent: Jan. 26, 2016

(54) SUSPENSION CONNECTOR SYSTEM CONFIGURED FOR USE WITH SUSPENDED SCAFFOLDING, AND RELATED METHODS

(71) Applicant: Safway Services, LLC, Waukesha, WI (US)

(72) Inventors: Mathieu Grumberg, Delmar, NY (US); Roy Scrafford, Scotia, NY (US)

(73) Assignee: Safway Services, LLC, Waukesha, WI (US)

( * ) Notice: Subject to any disclaimer, the term of this patent is extended or adjusted under 35 U.S.C. 154(b) by 248 days.

(21) Appl. No.: 13/762,173

(22) Filed: Feb. 7, 2013

(65) Prior Publication Data
US 2013/0199024 A1    Aug. 8, 2013

Related U.S. Application Data

(60) Provisional application No. 61/596,341, filed on Feb. 8, 2012.

(51) Int. Cl.
*F16M 13/02* (2006.01)
*B23P 11/00* (2006.01)
(Continued)

(52) U.S. Cl.
CPC ............... *F16M 13/02* (2013.01); *B23P 11/00* (2013.01); *E04G 3/30* (2013.01); *E04G 5/04* (2013.01); *Y10T 29/49826* (2015.01); *Y10T 29/49959* (2015.01)

(58) Field of Classification Search
CPC ............ F16M 13/02; E04G 3/30; E04G 5/04; B23P 11/00; Y10T 29/49959; Y10T 29/49826

USPC .......... 29/525.01, 525.08, 525.09; 248/228.1, 248/317, 323, 328
See application file for complete search history.

(56) References Cited

U.S. PATENT DOCUMENTS 1,205,792 A * 11/1916 Ryon Eppa H ................ D51/34
2,038,521 A *  4/1936 Bell .............................. 182/199
(Continued)

FOREIGN PATENT DOCUMENTS

CN        201863994        6/2011
CN      20102611631    *   6/2011
(Continued)

OTHER PUBLICATIONS

International Search Report and Written Opinion; International Application No. PCT/US2013/025178; date of mailing Jun. 20, 2013; 11 pages.

*Primary Examiner* — Jermie Cozart
*Assistant Examiner* — Bayan Salone
(74) *Attorney, Agent, or Firm* — Whyte Hirschboeck Dudek S.C.

(57) ABSTRACT

A suspension connector system configured for use with suspended scaffold systems and related methods of installation, assembly and use are disclosed herein. In accordance with at least one exemplary embodiment, methods of using a suspension connector system, for example, in relation to a structure, is disclosed. Suspension connector systems, as disclosed herein, can be affixed or otherwise connected to a structure so as to permit hanging of a suspended scaffold system, which can include work platform assemblies and access systems. Further in accordance with at least some embodiments of the present disclosure, a plurality of suspension connector systems can be connected to a structure, for example, in a predetermined pattern or an array, to support, or be combined with, a suspended scaffold system of the kinds disclosed.

22 Claims, 10 Drawing Sheets

(51) Int. Cl.
  *E04G 3/30* (2006.01)
  *E04G 5/04* (2006.01)

(56) References Cited

U.S. PATENT DOCUMENTS

| | | | | |
|---|---|---|---|---|
| 2,057,092 A | * | 10/1936 | Geib | 182/113 |
| 4,413,707 A | * | 11/1983 | Lienhard, Sr. | 182/150 |
| 4,421,205 A | * | 12/1983 | Vranish et al. | 182/82 |
| 4,509,711 A | * | 4/1985 | Wallther | 248/235 |
| 4,766,975 A | * | 8/1988 | Whitson | 182/150 |
| 4,815,563 A | * | 3/1989 | Puccinelli et al. | 182/150 |
| 4,872,632 A | * | 10/1989 | Johnson | B66D 3/10 248/332 |
| 5,145,032 A | * | 9/1992 | Puccinelli et al. | 182/142 |
| 5,350,071 A | * | 9/1994 | Pond | 211/70.6 |
| 5,678,654 A | * | 10/1997 | Uzawa | 182/150 |
| 6,742,306 B2 | * | 6/2004 | Petschke et al. | 52/27 |
| 2002/0066398 A1 | * | 6/2002 | Petschke et al. | 114/65 R |
| 2011/0062301 A1 | * | 3/2011 | Sloan | 248/304 |

FOREIGN PATENT DOCUMENTS

| | | | |
|---|---|---|---|
| GB | 1461651 A | * | 1/1977 |
| WO | 82/01026 A1 | | 4/1982 |

* cited by examiner

SUSPENSION CONNECTOR SYSTEM CONFIGURED FOR USE WITH SUSPENDED SCAFFOLDING, AND RELATED METHODS

CROSS REFERENCE TO RELATED APPLICATIONS

This application claims the benefit of U.S. Provisional Application No. 61/596,341, filed Feb. 8, 2012, the disclosure of which is incorporated by reference in its entirety herein.

FIELD OF THE INVENTION

The present invention generally relates to the field of scaffolding that is erected to access various parts of various structures. More particularly, the present invention relates to a suspension connector system that can be used to suspend or hang scaffolds. In one aspect, the suspension connector system can be used to suspend or hang scaffolding from a structure, such as an offshore vessel.

BACKGROUND

Scaffold systems, including work platform assemblies, are commonly suspended or hung when utilized for personnel to access a structure for erection, repair, inspection, and the like. Such scaffolding systems are commonly referred to as "suspended scaffold systems" or "hung scaffold systems" (or, more simply, suspended or hung scaffolds or scaffolding) and include scaffold systems that are both entirely and solely suspended and scaffold systems that are partially supported by a support structure (e.g., hung supported scaffold systems). The structures with respect to which scaffolds are suspended or hung often take the form of a steel structure or vessel with exposed structural members, such as steel I-beams. These exposed structural members typically are connected to and extend from the structure or vessel hull and facilitate attachment and suspension of suspended scaffolds.

Figure 8:
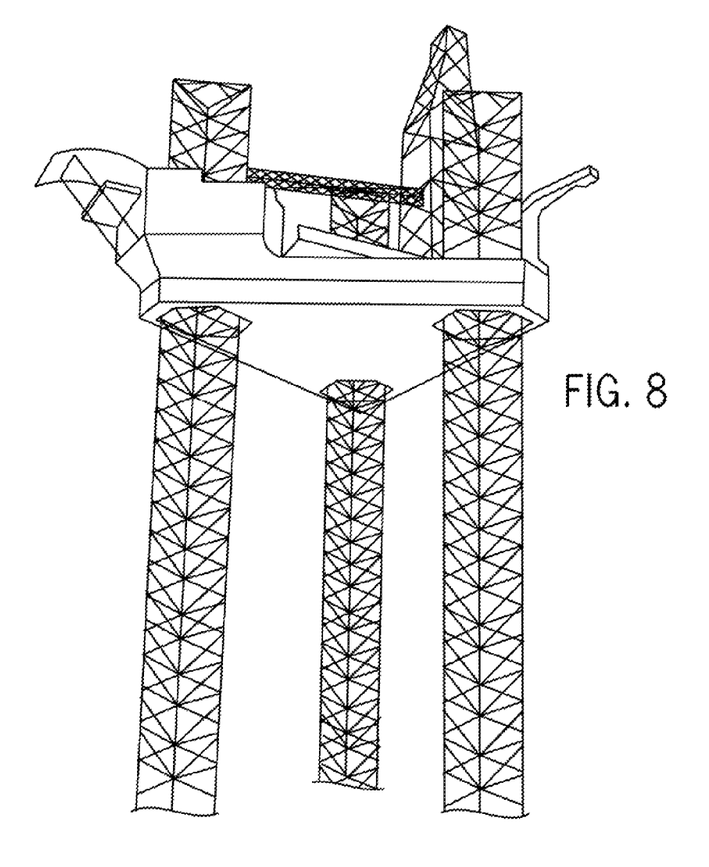
FIG. 8 is an illustration of an exemplary structure that can be used in conjunction with the suspension connector system in accordance with embodiments of the present disclosure.

However, some such structures, such as some types of offshore oil drilling and pumping platforms have flat, or at least generally flat, hulls or hull surfaces with few, if any, exposed structural members that can be used to secure or suspend a scaffold system. FIG. 8 provides an illustrative example of such structures. Currently, there are believed to be hundreds of "jack up" oil drilling rigs operating in the Gulf of Mexico alone. These structures are ocean going vessels with smooth steel hulls. These vessels generate significant oil revenue when in operation.

Due to environmental and other conditions, and as referenced above, these structures require periodic, if not frequent inspections, cleanings, and repairs. For example, to repair worn hull surfaces, walls gathering or collecting debris, or to perform other spot repairs, and/or to repair equipment mounted with respect to the structure. Moreover, often the height of structures with respect to which scaffolds might be suspended can be quite large. For example, some offshore platform structures are on the order of 50 to more than 100 feet above a surface of the water.

For these and other applications, one solution that has been attempted involves installing welded connections, such as plate eyes (also referred to as "eye plates"), or pad eyes. Still, connections such as plate eyes and pad eyes are less than ideal for a variety of reasons. For instance, when a vessel or other structure is placed in dry dock for repairs, the plate eyes or pad eyes that are welded to the structure may puncture the vessel hull due to the small projected area of the component. In addition, rigging connections added subsequent to construction of the vessel represent a potential hazard during rigging and hoisting operations in that they can be used for purposes other than as initially intended. Still further, plate eyes and pad eyes extend from a vessel, allowing them to be susceptible to collecting any debris or material (e.g., marine growth) that can become attached or embedded in the structures. Thus, the plate eye and pad eye structures, along with collected material, can increase propulsion resistance during transport of the vessel (or other structure) from one location to another. Lastly, plate eyes and pad eyes, which are not generally designed for hung-supported scaffolding applications, do not facilitate connection of such scaffolding from a vessel or other structure in a readily usable manner. More generally, due to the inability to suitably secure suspended or hung scaffolds from these structures, the structures must be removed from service for access to their hulls for inspection, refurbishment or repair, resulting in down time and in loss of revenue.

For at least these reasons, therefore, it would be advantageous if a new or improved suspension connector system, particularly one that that can be used to suspend or hang scaffolding from a structure (e.g., an offshore platform) and/or method(s) of use could be developed that addressed one or more of the above-described concerns.

SUMMARY

In accordance with at least some embodiments, a suspension connector system is disclosed herein which comprises: a fastening structure configured to be connected to a structure; and a suspension connector assembly structured to removeably engage the fastening structure and to at least partially support at least a portion of a suspended scaffold system.

In accordance with at least some other embodiments, a suspension connector system structured to at least partially support at least a portion of a suspended scaffold system is disclosed which includes: a fastening structure including a plate or plate-like structure; and a suspension connector assembly including: connector frame assembly which includes a fastening structure receiving area that is structured to removeably engage at least a portion of the plate or plate-like structure; a first connector locking structure configured for at least partially lockingly securing the suspension connector assembly to the fastening structure; a second connector locking structure configured for at least partially lockingly securing the first connector locking structure in relation to the connector frame assembly; and at least one additional structure connected to the connector frame assembly and structure configured for receiving and supporting a coupling device.

Methods of using a suspension connector system are disclosed in accordance with embodiments of the present disclosure. The methods, in at least some embodiments, include: connecting a fastening structure to the structure; and removeably engaging a suspension connector assembly with the fastening structure.

Additionally, in at least some further exemplary embodiments, the present invention relates to one or more suspension connector systems configured for implementation and/or installation with respect to a structure, in combination with a scaffold system that is configured to be, and in at least some embodiments is, suspended from the one or more suspension connector systems.

Various other aspects and embodiments of the present invention will be apparent from a thorough review of the present disclosure.

BRIEF DESCRIPTION OF THE DRAWINGS

Features of the present disclosure which are believed to be novel are set forth with particularity in the appended claims.

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. It is noted that that representative components, materials and dimensions for various structures, assemblies, components and the like are provided in the drawings, with such drawings and other information included in and constituting a part of the present disclosure. Like reference numerals are used to indicate like components.

In the drawings.

DETAILED DESCRIPTION

Figures 1A, 1B:
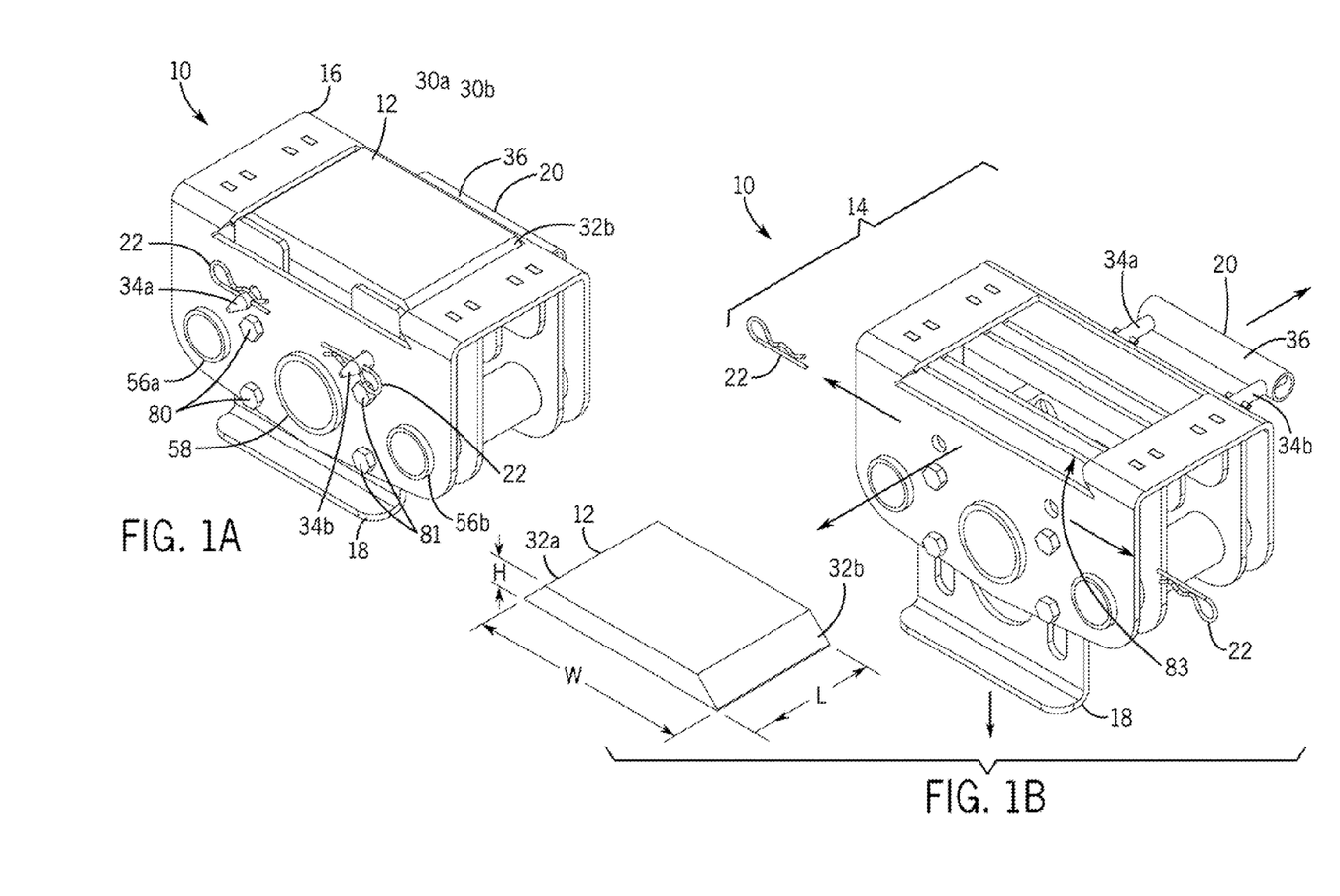
FIGS. 1A and 1B are perspective views of a suspension connector system, shown in an assembled and unassembled (or at least partially unassembled) form, along with components of the suspension connector system, including a fastening structure and a suspension connector assembly, which suspension connector assembly further includes a connector frame assembly, a first connector locking structure, a second connector locking structure; and a plurality of connector retaining mechanisms, in accordance with at least some embodiments of the present disclosure.

FIGS. 1A and 1B are perspective views of a suspension connector system 10, generally referred to with the numeral 10, in accordance with embodiments of the present disclosure. FIG. 1A particularly illustrates the suspension connector system 10 in an assembled form, while FIG. 1B illustrates the suspension connector system 10 in unassembled (or at least partially unassembled) form. Assembly and disassembly are described further herein with additional reference to FIG. 6. The suspension connector system 10, as shown, includes a fastening structure 12 and a suspension connector assembly, which is generally referred to by the numeral 14 (FIG. 1B). In accordance with at least some embodiments, the suspension connector assembly 14 includes a connector frame assembly 16, a first connector locking structure 18, a second connector locking structure 20; and a pair of connector retaining mechanisms 22.

The fastening structure 12, in accordance with embodiments of the present disclosure, takes the form of a plate or plate-like structure that is secured to larger structure (a representative example of which is shown in subsequent figures). More particularly, the fastening structure 12 is typically secured to the exterior hull (e.g., vessel hull) in a manner that will distribute and transfer loads (e.g., large loads from the scaffold subsequently to be hung) throughout the structure, for example, to various vessel structural members. The fastening structure 12, in at least some embodiments, takes the form of a unitary, rigid, trapezoidal structure which includes symmetrical ramped or angled surfaces 32a-b (32a hidden), which are used to engage suspension assembly 14 as described further below.

Advantageously, the shape of fastening structure 18 can be made by one or more low cost methods, such as laser cutting. In accordance with at least some embodiments of the present disclosure, the fastening structure 12 shown can include a length "W" of 8.88 inches, a width "W" of 5.25 inches, and a thickness or height "H" of 1.25 inches. With these dimensions and in general, the fastening structure 12 is, in accordance with at least some embodiments, comprises a low-profile structure.

The second connector locking structure 20 includes a pair of pin structures 34a-b that are connected by a handle portion 36. The second connector locking structure is sized to extend through the suspension assembly 16, with the pin structures 34a-b protruding there from, so as to be retained in place. As shown, each of the retaining mechanisms 22 pass through respective one of the pin structures 34a-b to accomplish retention.

FIGS. 2A-2D illustrate perspective, front, top sectional and side sectional views, respectively, of the connector frame assembly 16 as noted above. The connector frame assembly 16 includes an outer frame structure 40, which in at least some embodiments can take the form for a U-shaped frame structure having a pair of upright (e.g., vertical) portions 42a-b connected by way of a pair of central connecting portions 44a-b. FIGS. 3A-3D illustrate enlarged perspective, front, top and side views, respectively, of a portion of the connector frame assembly of FIGS. 2A-2D. That is, FIGS. 3A-3D illustrate, in greater detail, the outer frame structure 40.

With reference to FIGS. 2A-2D and FIGS. 3A-3D, the connector frame assembly 16 further includes a pair of additional upright (e.g., vertical) plate structures 46, 48 (also termed "mid plates") that are spaced in between and generally coextensive in length with the upright portions 42a-b of the frame structure 40, as well as a pair of shorter plate structures 50, 52 (also termed "gusset plates"). A portion of upright portion 42a remains open to receive fastening structure 12, while portion of upright portion 42b serves as a stop for the fastening structure. The plate structures 46, 48, 50, 52 are connected to the outer frame structure 40 via engaging holes 54a-h which receive the plate structures (and particularly extensions of the plate structures) as shown. Frame assembly 16 further comprises a plurality coupling structures that take the form or structure, or comprise, of pipe (or pipe-like) structures and, more particularly, a pair of outwardly positioned first, smaller pipe structures 56a-b, as well as a second, larger pipe structure 58, which is disposed in a central manner between the smaller pipe structures. As shown, the each of the pipe structures 56a-b and 58 are round, tube like structures and the larger pipe structure has a larger diameter than the smaller pipe structures, which are each of the same diameters.

A variety of alternative embodiments are contemplated and considered within the scope of the present disclosure. For example, the pipe structures 56a-b and 58 may each be of the same size and thus have the same diameter. In accordance with at least some embodiments, the frame assembly components are typically welded, or otherwise joined, to provide secure connection.

With continuing reference to FIGS. 2A-2D and FIGS. 3A-3D, each of the pipe structures 56a-b and 58 are positioned to reside within and extend through the upright plate structures 46, 48 (via holes) and the upright portions 42a-b, again via holes (illustrated particularly in FIGS. 3A-B), and beyond their respective the outer surfaces (i.e., beyond the front and rear faces of the frame assembly 16). For example, pipe structures 56a-b are configured to receive and support a first type of coupling device and pipe structure 58 is configured to receive and support a second type of coupling device. More particularly, and in accordance with embodiments of the present disclosure, pipe structures 56a-b are generally configured to serve as an attachment for hung supported scaffolding, while pipe structure 58 is configured as an attachment for suspended scaffold systems more generally. As shown, the coupling structure 56a-b would typically accommodate a smaller device that coupling structure 58. Such chains or other coupling devices, particularly including chain mechanism 57 with its chain coupler device 59, can be utilized to suspend or hang a suspended scaffold system as described further herein. In one example, structure 58 can, in at least some embodiments, receive a chain mechanism 57 (shown in phantom) together with a chain coupler device 59, or similar coupling device(s). In sum, suspension connecting system 10 includes structures 56a-b and 58, which can or are configured to serve as connections to hang (e.g., via chain and/or other coupling mechanisms) supported scaffold components.

In accordance with at least some embodiments, the pipe structure 58 includes a diameter, or is otherwise sized, to fit within holes 61a-b of the frame structure 40, and to maintain a full strength of an associated chain. For example, in an embodiment, the pipe structure 58 includes a diameter of 2.875 inches, fit within holes 61a-b each having a diameter 2.9 inches, and maintains the full strength of a ⅜ grade 100 chain. In accordance with at least some embodiments, pipe structures 56a-b each include a respective diameter, or are otherwise sized, to fit within respective holes 63a and 63a', respectively, and 65b and 65b', respectively and to accommodate a respective scaffold clamp (not shown). For example, in an embodiment, pipe structures 56a-b each have a diameter of 1.9 inches, and fit within holes in the frame structure 40 each having diameters of 1.925 inches.

Figure 2A:
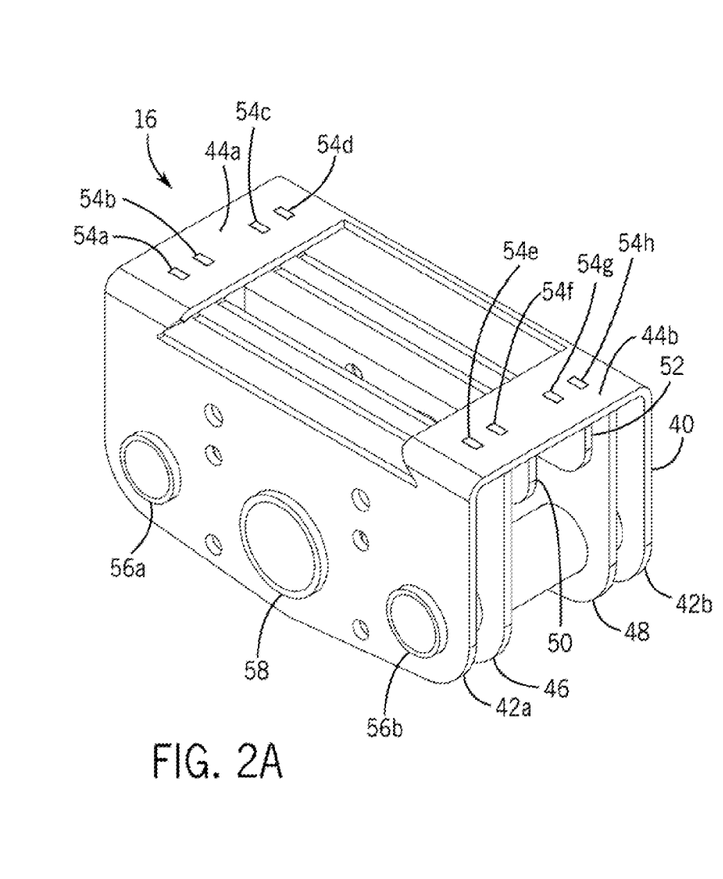
FIGS. 2A-2D are perspective, front, top sectional and side sectional views, respectively, of the connector frame assembly of FIGS. 1A-1B, with the top sectional view taken along line 2C-2C and the side sectional view taken along line 2D-2D.
Figure 2B:
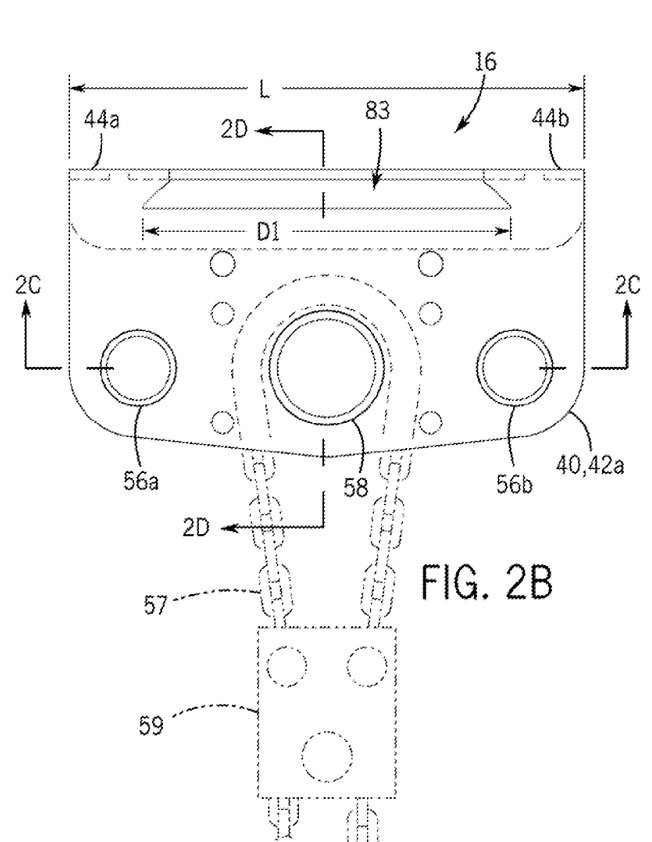
Figure 2C:
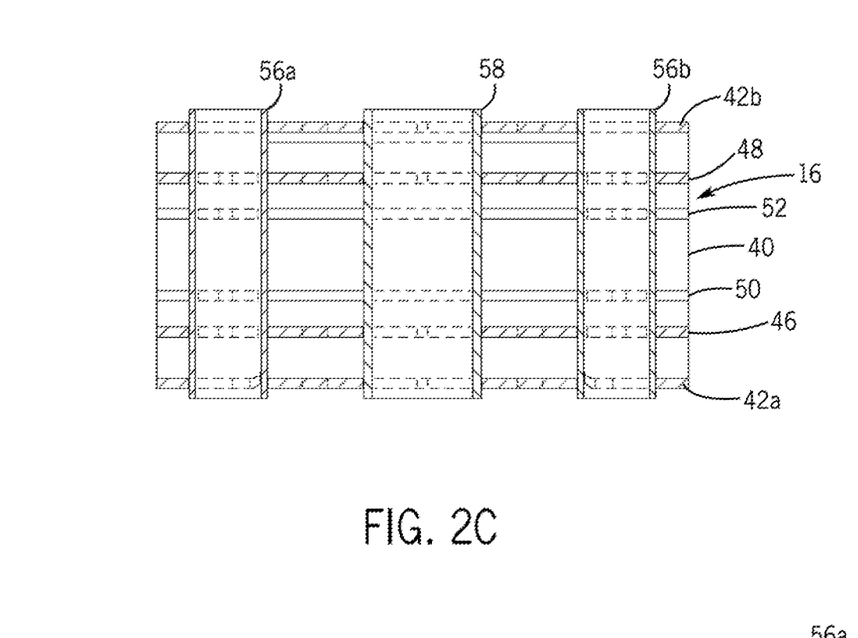
Figure 2D:
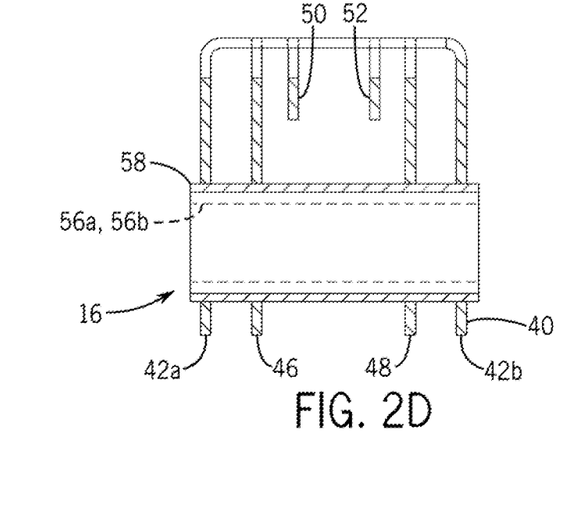
Figure 3A:
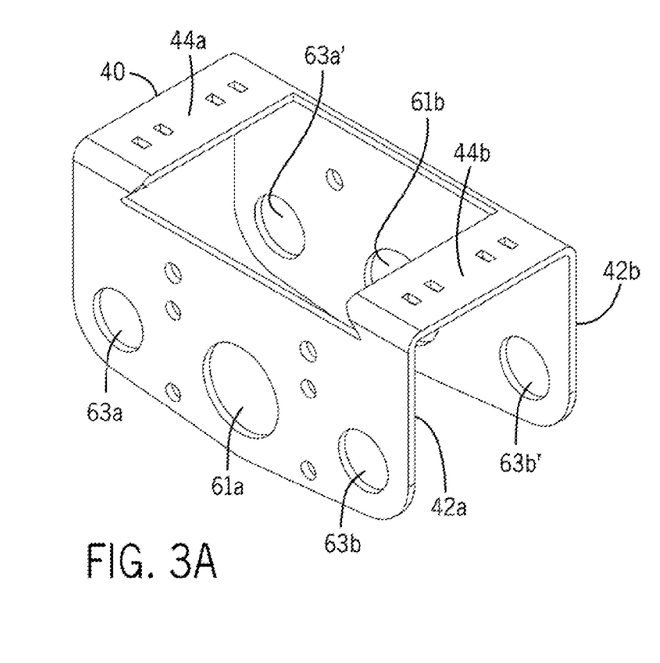
FIGS. 3A-3D are enlarged perspective, front, top and side views, respectively, of a portion of the connector frame assembly of FIGS. 2A-2D.
Figure 3B:
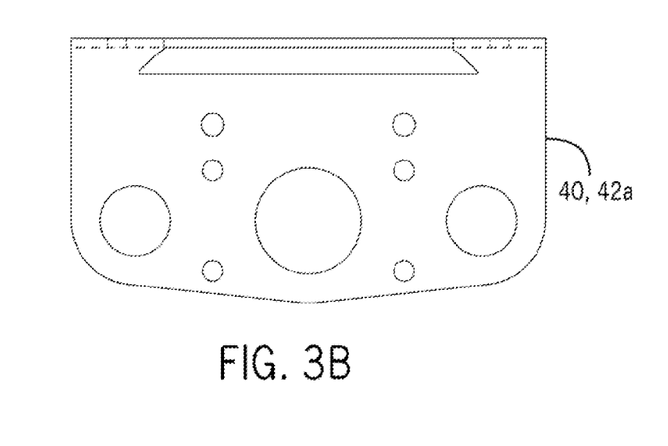
Figures 3C, 3D:
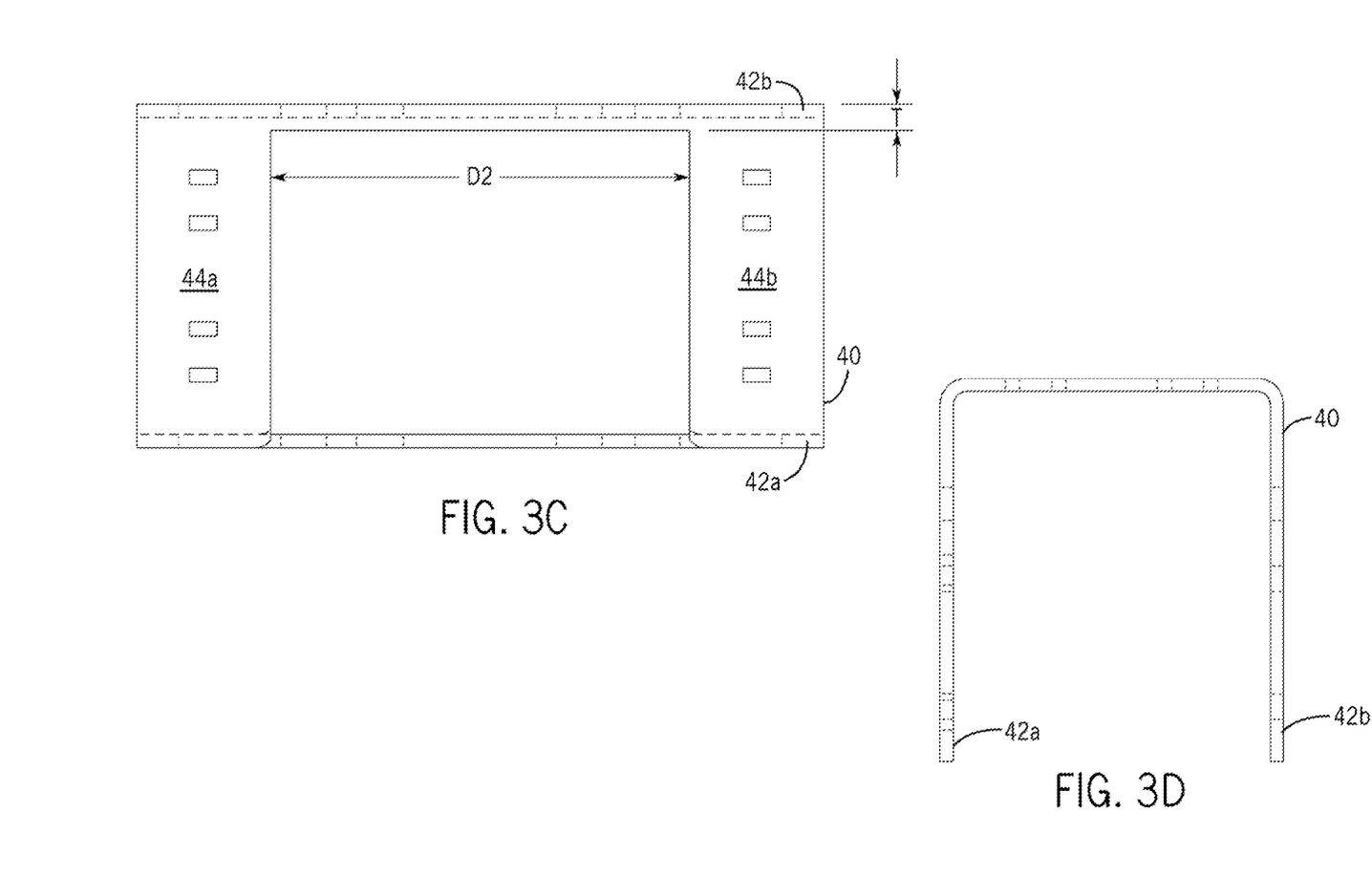

With reference to FIGS. 2B and 3C, frame structure 40 includes a fastening structure receiving area, which is generally referenced by numeral 83, for receiving fastening structure 12. In accordance with at least some embodiments, the frame structure 40 has an overall length "L", and the frame structure receiving area includes dimensions "D1", "D2" and "T". In one exemplary embodiment, the dimension D1 is 9.19 inches, dimension D2 is 7.93 inches, dimension T is 0.50 inches and the overall length "L" of the frame structure 40 is 13 inches. As can be seen, in accordance with at least some embodiments of the present disclosure, the fastening structure can be termed, or take the form of, a "dovetail plate" which interfaces with the fastening structure 40 via a fastening structure receiving area 83 having a form that corresponds to and surrounds, so as to receive the dovetail plate so as to provide a dovetail or dovetail-like interconnection or joint.

Figure 7:
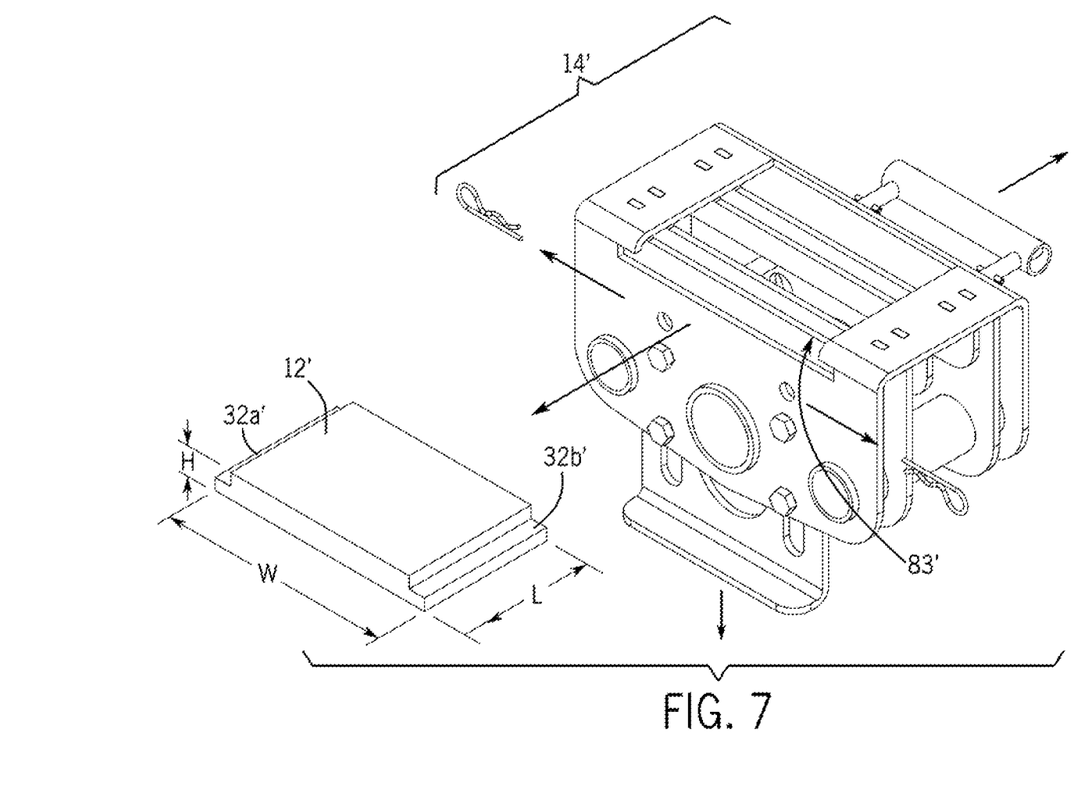
FIG. 7 illustrates a suspension connector system including a fastening structure and suspension connector assembly in accordance with alternative embodiments of the present disclosure.

With reference now to FIG. 7, a fastening structure 12' and suspension connector assembly 14' are illustrated in accordance with alternative embodiments of the present disclosure. More particularly, by way of example and not limitation, one or both of the angled surfaces 32a-b (e.g., shown from FIG. 1B) of the fastening structure 12 can be reshaped or replaced with step, or step-like structures 32a' and 32b' of fastening structure 12', which are structured to interface with and engage suspension assembly 14'. For example and in accordance with at least some embodiments, step or step-like structures 32a' and 32b' can be structured similar to an angle iron, which typically includes an "L-shaped" surface or cross-section formed at or about at a right angle. Additionally, and in accordance with at least some embodiments, the fastening structures can be structured to include at least a portion that is over (or under) cut, thereby providing a lip, protuberance, or other structure or surface to provide engagement with one or various embodiments of the suspension connector assembly as described further below. In accordance with embodiments of the present disclosure herein and as additionally shown in FIG. 7, the fastening structure 14' includes a fastening structure receiving area 83' that is generally sized and shaped to conform to, and permit engagement with, fastening structure 12'. Alternative embodiments of the fastening structure and the suspension connector assembly are contemplated and considered within the scope of the present disclosure.

Figure 4A:
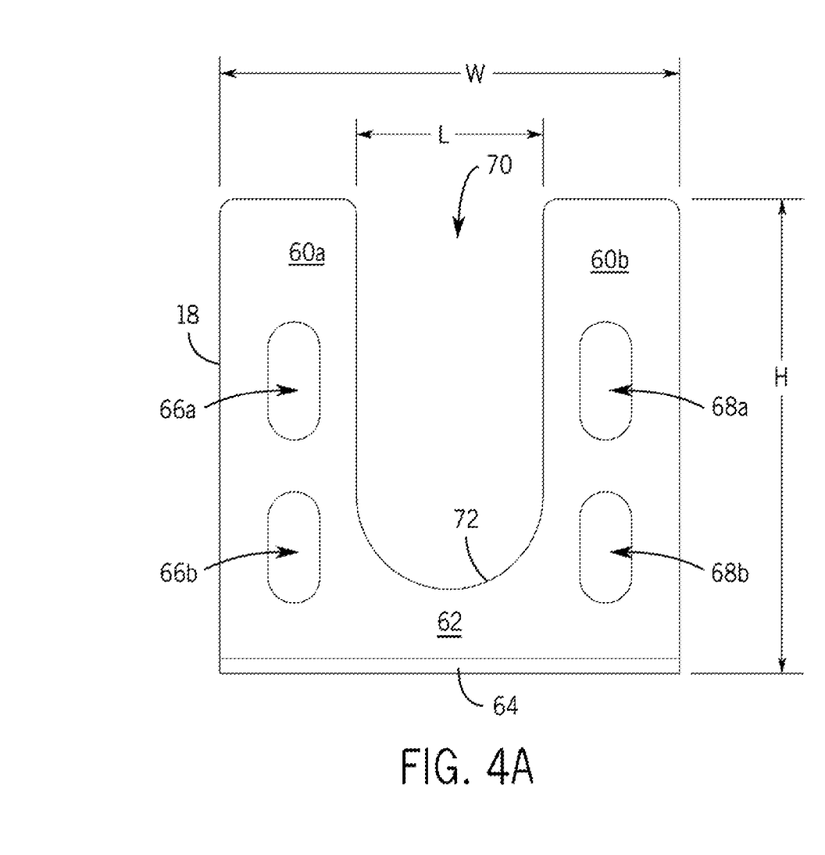
FIGS. 4A-4C are enlarged front, top and side views, respectively, of the first connector locking structure of FIGS. 1A-1B.
Figures 4B, 4C:
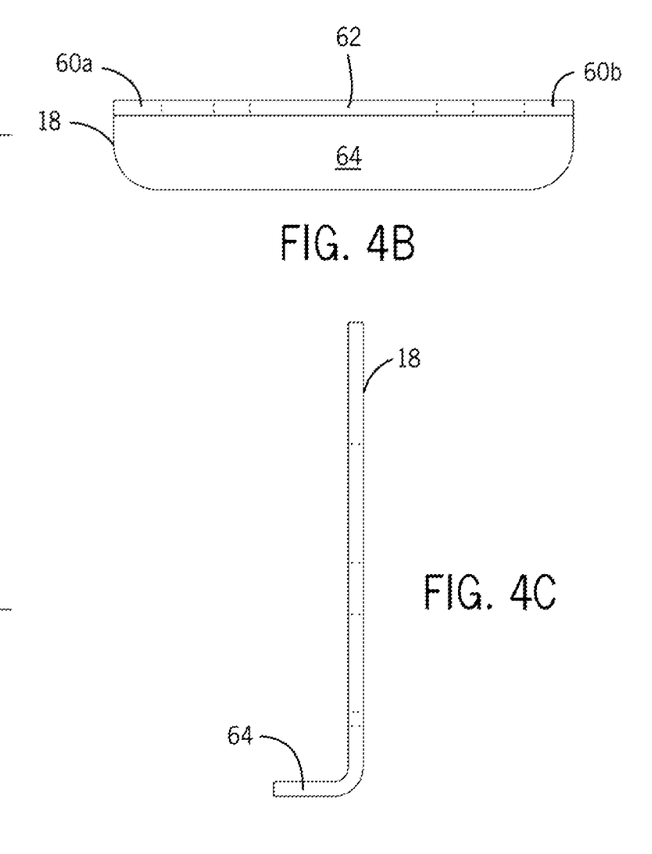

FIGS. 4A-4C are enlarged front, top and side views, respectively, of the first connector locking structure 18 of FIGS. 1A-1B. As shown, the first connector locking structure 18 is a generally rigid, unitary structure that includes a pair of "ear-like" side portions 60a-b (also referred to as "tangs") that are connected by way of, and extend away (e.g., upwardly away) from, a central portion 62. In at least some embodiments, the first connector locking structure is a plate or plate-like structure. The first connector locking structure 18 also includes a bent portion 64 structure to facilitate manual gripping and holding by a user. Each of the side portions 60a-b includes a pair of openings 66a-b and 68a-b, respectively, which, in accordance with at least some embodiments, are sized to accommodate pins 76 as described with respect to FIGS. 5a-b. A pipe structure receiving channel or opening 70 is formed between side portions 60a-b for receiving pipe structure 58, for example, until pipe structure 58 contacts or abuts contoured (e.g., round) surface 72, to limit travel of the first connector locking structure 18.

In accordance with at least some embodiments, the first connector locking structure 18 has a height "H" sufficient for side portions 60a-b to lock or prevent movement relative movement of the fastening structure when positioned within the receiving area 83 as described further below. In one exemplary embodiment, the height "H" is 8 inches. Additionally, in accordance with at least some embodiments, the first connector locking structure 18 has an overall width "W" sized to fit in and pass through the receiving area 83, and pass through its dimensions D1 and D2 as previously described with respect to FIG. 3C. In one embodiment, the overall width "W" is 7.75 inches. Also, in one embodiment, the pipe structure receiving channel has a width "L" of 3.15 inches to accommodate the pipe structure 58 having a diameter of 2.875 inches.

Installation/Removal—Use

Figure 5A:
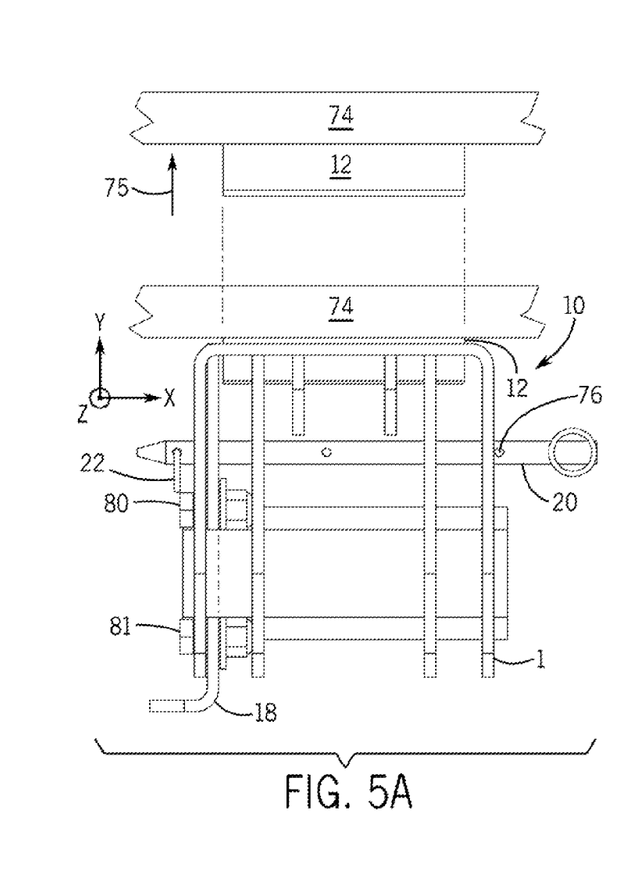
FIGS. 5A and 5B are side views of the suspension system of FIGS. 1A and 1B, and further illustrating a use of the suspension connector system, including assembly (installation) and disassembly of the system.
Figure 5B:
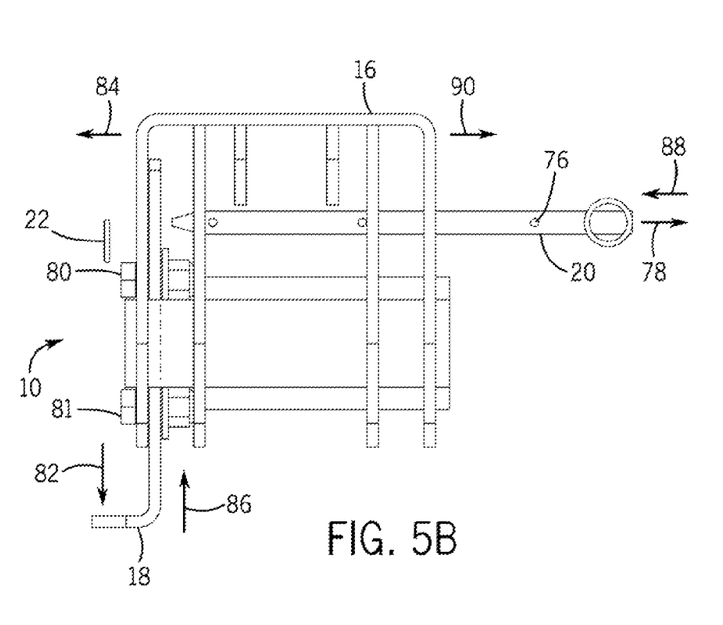

FIGS. 5A and 5B are side views of the suspension connector system of FIGS. 1A and 1B (which for convenience are again illustrated on the same page) and, together with FIGS. 1A-1B, further illustrate an example process of implementation (installation/removal) and use of the system in relation to an exemplary structure 74 (e.g., an oil rig platform).

In accordance with a first step of the exemplary process, fastening structure 12 is affixed (e.g., welded) or otherwise connected in a secure manner to a structure 74. Affixing of the fastening structure with respect to structure 74 is indicated by arrow 75, corresponding to a "Y" direction in the exemplary axes shown. In at least some embodiments, the fastening structure can be welded to a structure all the way around its perimeter to provide a completely or at least substantially sealed union between the fastening structure and the structure (e.g., platform, vessel, ship, etc.) so as to eliminate, or substantially eliminate, the entry or entrainment of corrosive or other debris or material.

In a second step, connector retaining mechanisms 22 are removed from the second connector locking structure 20 (describe above). Removal of the connector retaining mechanisms permits movement of the second connector locking structure 20.

In a third step, the second connector locking structure 20 is slid and retracted (typically outwardly), or otherwise moved, a distance from an initial position to a final position with respect to the connector frame assembly 16. As shown, the initial and final positions are pre-determined, for example, these positions are determined by a plurality of devices (e.g., pins, roll pins, etc.) 76, which restrict movement to a pre-determined distance. Movement of second connector locking structure 20 is illustrated by arrow 78, corresponding to an X direction in the exemplary axes shown. Movement of the second connector locking structure 20 permits movement of the first connector locking structure 18.

In a fourth step, the first connector locking structure 18 is slid, typically downwardly (e.g., by force of gravity, or by force of gravity plus an additional assisting force, such as manual pulling), or otherwise moved, from an initial (e.g., raised) position to a final (e.g., lowered) position in relation to the connector frame assembly 16. As shown, the initial and final positions are pre-determined. For example, these positions are determined by a plurality of devices (e.g., hexagonal bolt and washer assemblies, etc.) 80, 81, passing through and interfacing with holes (holes 66a-b and 68a-b shown FIG. 4A) within the first locking structure, such that movement of the first connector locking structure 18 is restricted to a pre-determined distance. Stated another way, the initial and final positions are limit positions in so far as travel of the first connector locking mechanism is limited to the distance between these positions. Devices 80 and 81 prevent full removal of first connector locking structure 18 from the suspension connector assembly, while permitting free movement of first connector locking structure 18, is illustrated by arrow 82, corresponding to the negative Y direction in the exemplary axes shown.

In a fifth step, suspension connector assembly 14 is slid or otherwise positioned on or in relation to, so as to engage, the fastening structure 12. More particularly, and in accordance with at least some embodiments, ramped or angled surfaces 32a-b (FIG. 1B) engage surfaces of connector frame structure 40 so as to receive and engage suspension connector assembly 14 in fastening structure receiving area or channel, which is generally referenced by numeral 83 and which is shown in FIG. 1B (as well as FIG. 2B). Such movement is indicated by arrow 84, corresponding to a negative X direction in the exemplary axes shown. It is contemplated that the movement between the suspension connector assembly 14 and the fastening structure 12 can, in at least some embodiments, be characterized as a loose, sliding fit, (along the contacting surfaces of the fastening structure 12 and the assembly 14) such that the movement and hanging can be accomplished manually. In general, the fastening structure 12 is received into an open end of the receiving area 83 formed, at least in part, by plate 42a, and sliding continues until the fastening structure is stopped by at least a portion of plate structure 42b.

At this point, suspension connector assembly 14 is "hung" on fastening structure 12 such that the fastening structure bears the weight of the suspension connector assembly 14. In addition, the fastening structure 12 is retained within, or with respect to, the suspension connector assembly 14 in the fastening structure receiving area 83. Such mating engagement results in relative movement between the fastening structure 12 and the suspension connector assembly 14 being limited to the X (and negative X) direction(s), while relative movement in the Y (and negative Y) and Z (and negative Z) directions is prevented.

In a sixth step, first connector locking structure 18 is slid in a direction opposite direction 82 noted above, namely, in a direction indicated by arrow 86 (corresponding to a Y direction in the exemplary axes shown) until first connector locking structure engages the fastening structure 12. More particularly, the first locking structure is slid or otherwise moved until portions 60a and 60b (FIG. 4A) are adjacent the fastening structure 12. 18. The suspension assembly 14 is at least partially secured with respect to the fastening structure 12, such that relative movement in the X (and negative X) direction is prevented.

In a seventh step, second connector locking structure 20 is slid, or otherwise moved, in a direction indicated by arrow 88, corresponding to a negative X direction in the exemplary axes shown. Such movement is to an extent (again corresponding to a predetermined distance as noted above) necessary to secure the first connector locking structure 18. More particularly, movement continues so as to secure the first connector locking structure in the position (e.g., a raised position) in which it is engaged with the fastening structure 12.

And in a final step, connector retaining mechanisms 22 are reinserted with respect to, so as to engage, the second connector locking structure 20, as shown, via the portions passing through the connector frame assembly 16 and the first connector locking structure 18. The suspension connector assembly 14 is now installed with respect to fastening structure 12 that is further attached to a structure 72. Thus, the suspension connector system 10 is installed and configured or structured to support a hung or suspended scaffold system.

In a similar manner, suspension connector assembly 14 may be removed from the fastening structure and so, at least in this sense the suspension connector system 10 is "removable", or at least substantially removable. More specifically, a process or implementation of removing or uninstalling the suspension assembly from the fastening structure 12 involves generally reversing the sequence of steps described above, as well as reversing the relative movement as described with regard to respective components of the suspension connector system during each such associated step. For example, when step 5 noted above is reversed, suspension connector assembly 14 can be slid or otherwise positioned away from, so as to be uncoupled or removed from, the fastening structure 12, with such movement indicated by arrow 90, corresponding to an X direction in the exemplary axes shown.

As noted, the suspension connector system 10 includes a removable suspension connector assembly 14 that is configured to be secured to the fastening structure as set forth herein. Stated another way, in accordance with embodiments of the present disclosure, a suspension connector system 10 is disclosed which includes a fastening structure and a suspension connector assembly that is configured or structured to engage the fastening structure. Accordingly, the likelihood that the suspension connector system can be utilized for unauthorized rigging, hoisting or suspension is diminished, or altogether eliminated.

Figure 6:
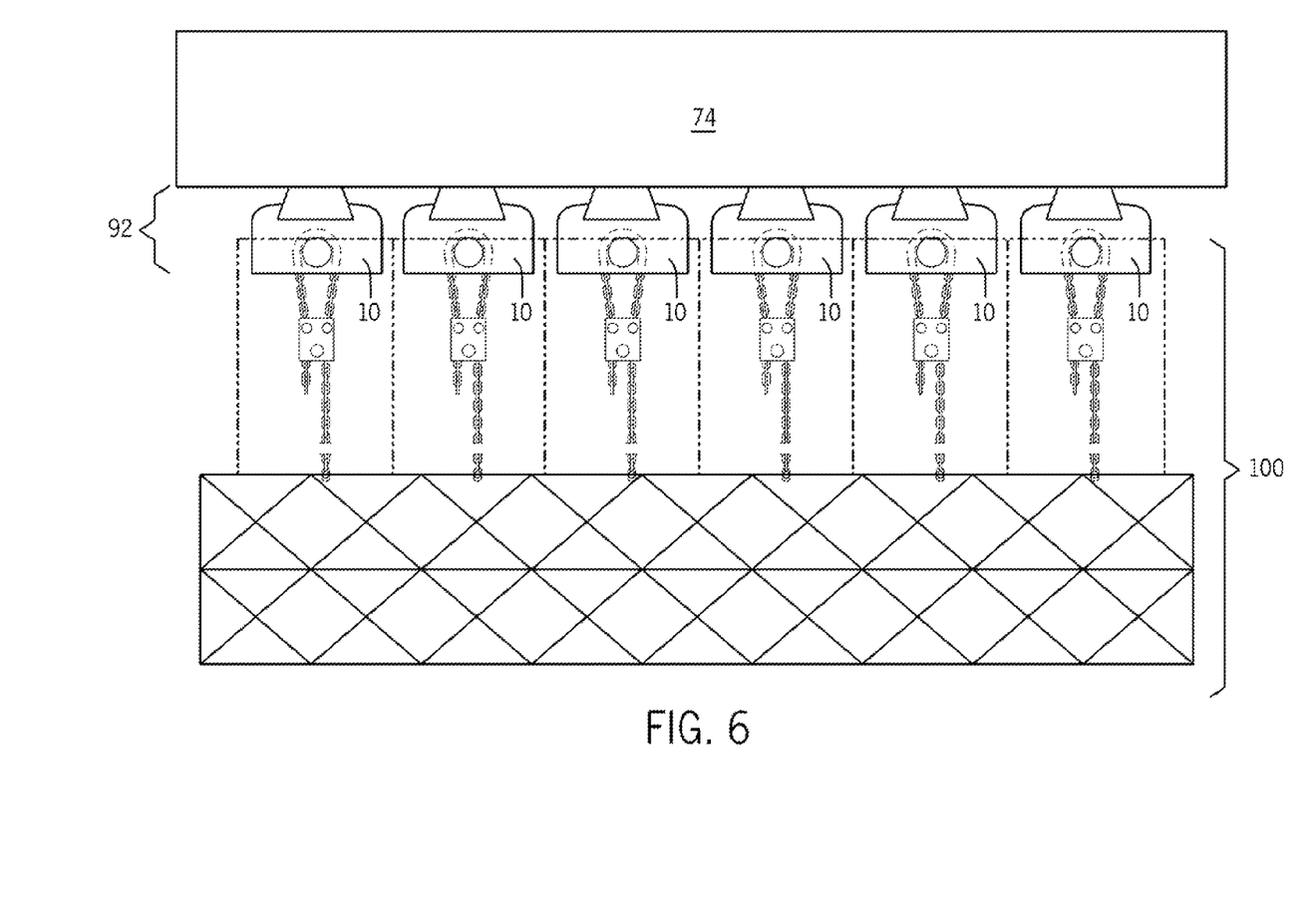
FIG. 6 illustrates an exemplary arrangement of the suspension connector systems positioned in relation to a structure and shown supporting a suspended scaffold system, in accordance with exemplary embodiments of the present disclosure.

The above referenced procedure can be repeated multiple times using a multiplicity of suspension connector systems of the kind described herein to provide a structure having a plurality of suspension connector systems that are positioned in a manner that is suitable to support a hung or suspended scaffold system. More particularly, FIG. 6 provides a schematic illustration of an exemplary arrangement 92 of suspension connector systems 10 positioned in relation to a structure 72 in accordance with the procedures set forth above and herein, and thus which are suitable for use, or are in combination, with suspended scaffold systems, generally indicated by numeral 100. Such suspended scaffold systems include hung supported scaffolding, suspended scaffolds, including work platform systems (including articulating work platform access systems) suitable for suspension from another structure, for example, by way of coupling devices or assemblies, such as chain coupling devices and assemblies.

Despite the above method(s) being outlined in a step-by-step sequence, the completion of acts or steps in a particular chronological order is not necessarily mandatory. Further, elimination, modification, rearrangement, combination, reordering, of such steps is contemplated and considered within the scope of the present disclosure.

After completion of a scope of work using the suspended scaffolding, such as after painting or otherwise refurbishing a structure such as a platform, and after removal of the suspended scaffolding and the suspension connector assembly from the fastening structure, it is contemplated that only the fastening structure (or a plurality of such structures) will remain attached to the structure. Advantageously, the fastening structure is designed to be a low, or very low, profile structure. Accordingly, when transporting a vessel or other structure having the fastening structure(s) in water, the fastening structure(s) will not significantly increase propulsion resistance. In addition, it is contemplated that the fastening structure(s) may include a fairing to reduce resistance.

Advantageously, a suspension connector system provided in accordance with the present disclosure can provide a robust option that facilitates access to, while maintaining continued operation of, the structures to which suspension connector system(s) are attached. Advantageously, the fastening structure 10 (e.g., in the form of a "dovetail" plate or other suitable shape or device) can be secured to the structure (e.g., vessel) during its initial construction, during repairs while in drydock, or installed in the field during operation. And the requirement of moving the structure to dry dock, or other locations (and thus removing the structure from operation and service), so as to facilitate access for repair, refurbishment or inspection, is reduced or avoided altogether.

Notwithstanding that the description provided herein particularly focuses upon implementation of a suspension connector system with respect to a structure, and typically an at least generally flat or exterior surface (e.g., hull) of the structure. This is only intended as an example. Indeed, it should be appreciated that the same or similar (or substantially similar) processes for implementing suspension connector systems can be utilized in connection with a variety of other types of structures.

The particular shapes of the different components, assemblies, and structures of a given suspension connector system can, in many instances, vary. In merely one example, the pipe structures can take other shapes and can be structure to accommodate other coupling devices. And as noted above, the fastening structure can take on other shapes having other profiles.

The materials out of which the suspension connector system in other embodiments can be formed can vary depending upon the embodiment. For example, suitable materials for components of such suspension connector systems can include metal (e.g., steel, aluminum, etc.), but also other suitable materials. The suspended scaffold systems can include components typically made of metal (e.g., steel, aluminum, etc.) Also, such components can be made of items that are solid, corrugated, grated, smooth, or of other suitable configurations. For example, panel portions of such scaffold assemblies can be made of wood sheeting, plywood, roof decking material, metal on a frame, grating, steel sheeting, and the like, among other things. Also, it should be appreciated that a variety of types of linkages can be employed in suspending suspended scaffold systems from the suspension connector system(s) and relative to the support structure(s). As noted above, such linkages are contemplated to typically include chains, but can include other linkages that are typically flexible (e.g., wire, wire rope, or similar types of linkages), as well as in some cases rigid.

In at least some embodiments, the suspended scaffold systems can comprise work platform systems formed from multiple discrete components and, as such, worker(s) can modify or add to existing portions of the work platform system while physically supported upon an existing, installed portion of the work platform system. In at least some embodiments, worker(s) in such a circumstance can extend, relocate, or remove components of the work platform system using only hand tools, and no mechanical tools, hoists, cranes, or other equipment is required to add to, or subtract from, existing components of the work platform system. In at least some embodiments, installation of a work platform system can be done, essentially, "in the air". That is, the work platform system can be erected and connected together "in the air", in a piece-by-piece order via the use of multiple pieces of lifting, or hoisting, equipment. That said, in alternate embodiments, it is possible also that one or more of the scaffold system components will be preassembled on the ground, or at a remote location, and then moved and hoisted as a pre-assembled module into the desired location and suspended from a structure.

Although not discussed above, in other embodiments other types of components can be also included in a suspended scaffold system. For example, in some embodiments, a railing system can be attached to one or more portions. Railings of such systems can be manufactured from a variety of materials, such as chain, cable (e.g., galvanized aircraft cable), line, and the like, among other things. For example, the railing may be galvanized aircraft cable. In still additional embodiments, railing standards can also be used to erect a work enclosure system. For example, tarps, sheeting, or the like can be attached to railing standards to enclose work area(s) for various purposes.

Therefore, although certain embodiments of the present invention have been shown and described in detail above, it should be understood that numerous changes and modifications can be made without departing from the scope of the appended claims. Among other things, it should be appreciated that the scope of the present invention is not limited to the number of constituting components, the materials thereof, the shapes thereof, the relative arrangement thereof, etc., as described above, but rather the above disclosures are simply provided as example embodiments.

No representation made herein shall be considered to constitute any representation that any embodiments encompassed herein will be safe or satisfy any particular safety standard. Indeed, safe operation can depend on numerous factors outside of the scope of the present invention including, for example, manners of installation, maintenance, training of the individuals involved, etc. Moreover, terms or references (e.g., arrows) to describe relative positioning or movement of various elements of the suspension connector system in relation to one another and/or another reference point (e.g., to a structure, such as a rig or a vessel), it should be understood that the present invention is intended to encompass a variety of other embodiments having features that do not, or do not necessarily, satisfy one or more such relational characteristics described above.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A suspension connector system comprising:
   a fastening structure configured to be connected to a structure, the fastening structure comprising a plate or plate-like structure; and
   a suspension connector assembly structured to removeably engage the fastening structure and to at least partially support at least a portion of a suspended scaffold system wherein the suspension connector assembly comprises a connector frame assembly having a pair of upright portions connected by a pair of central connecting portions and a fastening structure receiving area, a pair of upright mid plates disposed between and coextensive with the upright portions, and a pair of gusset plates disposed between the upright mid plates, wherein the fastening structure receiving area is structured to receive the plate or plate-like structure.

2. The suspension connector system of claim 1, wherein the plate or plate-like structure includes a dovetail plate structure and the fastening structure receiving area that is structured to receive the dovetail plate structure and, when so received, the suspension connector assembly and fastening structure are removeably engaged at a dovetail interconnection.

3. The suspension connector system of claim 1, wherein the suspension connector assembly includes the connector frame assembly, at least one locking structure, and at least one additional structure for receiving and supporting a coupling device.

4. The suspension connector system of claim 3, wherein the fastening plate or plate-like structure includes a dovetail plate structure and the fastening structure receiving area is structured to receive the dovetail plate structure and, when so received, the suspension connector and fastening structure are removeably engaged at a dovetail interconnection.

5. The suspension connector system of claim 3, wherein the fastening structure includes a low profile structure and the fastening structure receiving area is structured to be slidably coupled with the low profile structure.

6. The suspension connector system of claim 3, wherein the at least one locking structure is configured to lockingly secure the suspension connector assembly to the fastening structure when the suspension connector assembly is engaged with the fastening structure.

7. The suspension connector system of claim 6, wherein the at least one locking structure includes a first connector locking structure and a second connector locking structure and, wherein the first connector locking structure at least partially lockingly secures the suspension connector assembly to the fastening structure and the second connector locking structure at least partially lockingly secures the first connector locking structure in relation to the connector frame assembly.

8. The suspension connector system of claim 7, wherein the plate or plate-like structure includes a dovetail plate structure and the fastening structure receiving area is structured to receive the dovetail plate structure and, when so received, the suspension connector assembly and fastening structure are removeably engaged at a dovetail interconnection.

9. The suspension connector system of claim 7, wherein the at least one additional structure for receiving and supporting a coupling device includes a pipe structure for receiving a chain or chain-like coupling device.

10. The suspension connector system of claim 9, wherein at least one of: (i) the suspended scaffold system includes one or more work platform assemblies or systems, and (ii) the structure to which the fastening structure is configured for connection includes an offshore platform structure.

11. A method of using the suspension connector system of claim 1, the method comprising:
    connecting the fastening structure to the structure; and
    removeably engaging the suspension connector assembly with the fastening structure.

12. The method of claim 11, wherein:
    the removeably engaging includes engaging, using the fastening structure receiving area, the plate or plate-like structure.

13. The method of claim 11, wherein:
    the suspension connector assembly includes the connector frame assembly including the fastening structure receiving area, a first connector locking structure, a second connector locking structure, and a coupling device support structure; and the method further includes at least one of:
    at least partially locking the suspension connector assembly to the fastening structure using the first connector locking structure;
    at least partially locking the first connector locking structure in relation to at least one of the connector frame assembly and the fastening structure using the second connector locking structure;
    receiving and supporting, using the coupling device support structure, a coupling device; and
    suspending, using the coupling device, at least a portion of the suspended scaffold system.

14. The method of claim 13, wherein:
    the coupling device support structure includes a pipe structure,
    the coupling device includes a chain or chain-like coupling device;
    the fastening structure includes a dovetail plate structure; and
    the fastening structure receiving area is structured to receive the dovetail plate structure; and the removeably engaging further includes slidably positioning the suspension connector assembly with respect to fastening structure to form a dovetail interconnection; and the suspending includes suspending the at least a portion of the suspended scaffold system using the chain or chain-like coupling device.

15. The method of claim 11, wherein at least one of the connecting the fastening structure and the removeably engaging the suspension connector assembly with the fastening structure is repeated so as to provide a plurality of suspension connector systems connected to a structure and which are configured for suspending the suspended scaffold system, with the scaffold system optionally including one or more work platform assemblies or systems.

16. The method of claim 11, wherein, the suspension connector assembly is disengaged and removed from the fastening structure and, when so removed, the fastening structure remaining connected to the structure.

17. A suspension connector system structured to at least partially support at least a portion of a suspended scaffold system comprising:
  a fastening structure including a plate or plate-like structure; and
a suspension connector assembly including:
  connector frame assembly which includes a fastening structure receiving area that is structured to removeably engage at least a portion of the plate or plate-like structure;
  a first connector locking structure configured for at least partially lockingly securing the suspension connector assembly to the fastening structure;
  a second connector locking structure configured for at least partially lockingly securing the first connector locking structure in relation to the connector frame assembly; and
  at least one additional structure connected to the connector frame assembly and structure configured for receiving and supporting a coupling device,
  wherein the at least one additional structure includes a pipe or pipe-like structure and the coupling device includes a chain or chain-like coupling device configured for connection to the at least a portion of the suspended scaffold system; and the first connector locking structure includes a central portion and a plurality of side portions that are at least partially connected to, and extend away from, the central portion, and further including an opening between side portions for receiving the pipe structure.

18. The suspension connector system of claim 17, wherein the fastening structure includes a dovetail plate structure and the fastening structure receiving area is structured to receive the dovetail plate structure and, when so received, the suspension connector assembly and fastening structure are removeably engaged at a dovetail interconnection.

19. The suspension connector system of claim 17, wherein the fastening structure comprises a trapezoidal structure.

20. The suspension connector system of claim 19, wherein the trapezoidal structure comprises a unitary, rigid structure which includes symmetrical ramped or angled surfaces which are used to engage the suspension assembly when the fastening structure is received within the fastening structure receiving area.

21. The suspension connector system of claim 17, wherein the fastening structure comprises
  a structure which includes opposing surfaces that structured to engage the fastening structure receiving area.

22. The suspension connector system of claim 17, wherein the fastening structure comprises opposing stepped structures which are structured to engage the fastening structure receiving area.

* * * * *